Nov. 7, 1967   G. HALKIADES   3,351,084
FLUID LEVEL CONTROLLER
Filed Dec. 4, 1964

INVENTOR.
GEORGE HALKIADES
BY
Young and Quigg
ATTORNEYS 3,351,084
FLUID LEVEL CONTROLLER
George Halkiades, Bartlesville, Okla., assignor to Phillips
Petroleum Company, a corporation of Delaware
Filed Dec. 4, 1964, Ser. No. 416,068
9 Claims. (Cl. 137—416)

ABSTRACT OF THE DISCLOSURE

A discharge valve on a vessel is opened and closed in response to the level of liquid within the vessel. Once the discharge valve has begun to open, it will be moved to its fully open position even though the level of liquid within the vessel has dropped below the level at which movement of the valve was initiated.

---

Figure 1:
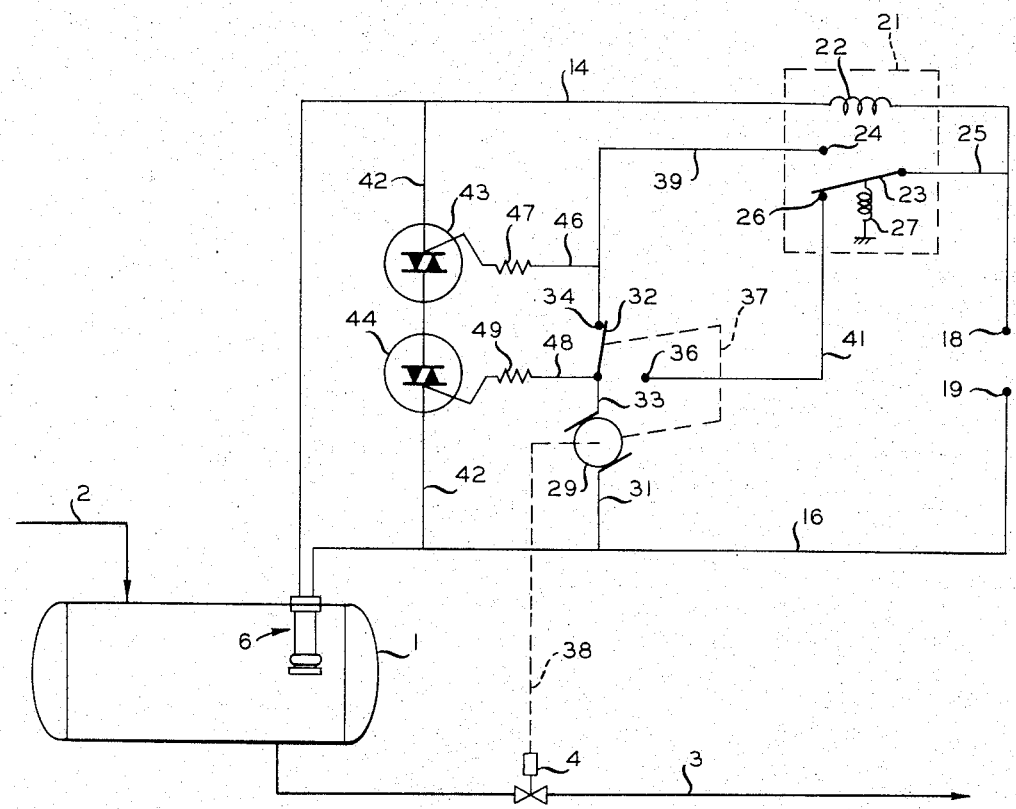

The invention relates to fluid level controllers. In one aspect, this invention relates to an apparatus for controlling the level of a liquid in a vessel. In another aspect, this invention relates to an apparatus for regulating the removal of a liquid from a vessel in response to the level of liquid in the vessel.

A typical device of the prior art for controlling the level of a liquid within a vessel involves the use of a liquid level sensing element which functions to sense the level of liquid within the vessel. The vessel is provided with a valve operatively connected to the sensing element in a manner which allows the valve to be opened when the liquid in the vessel is above a desired level. This will allow liquid to be removed from the vessel such that the liquid level in the vessel can be controlled. Since the valve is opened by means of a motor or the like in response to a certain liquid level, and since this level begins to drop as soon as the valve starts to open, it frequently happens that the sensing element functions to turn the motor off before the valve has been moved to its fully opened position. This is undesirable because it is impossible to maintain uniform rates of flow from the vessel with the valve in a partially open position.

According to this invention, these and other disadvantages of the prior art methods and apparatus for controlling the level of a liquid within a vessel are overcome by providing a novel electric circuit which will function to move a valve to its fully open position regardless of the position of a liquid level control switch which operates in response to the level of a liquid within a vessel. In accordance with this invention, the level of a liquid within a vessel in controlled by regulating the removal of liquid from the vessel in response to the level of liquid in the vessel. A reed switch or the like having an open and a closed position is operatively connected to the vessel and the novel electric circuit of this invention in a manner which will cause the circuit to transmit electric current when the reed switch is closed in response to a rise in the level of liquid within the vessel. An electric motor connected to the circuit and a valve which is connected to the vessel will operate in response to the electric current such that the valve can be moved from its closed to its open position to allow liquid to be removed from the vessel. The novel electric circuit of this invention includes an electrical conductor operatively connected across the reed switch such that it will serve to complete a circuit whereby current will continue to flow to the electric motor after the reed switch has opened due to the drop in the liquid level within the vessel. This will allow the electric motor to operate until the valve has been moved to its fully open position. The electrical conductor is provided with two bidirectional triode semiconductor switches connected in series. Each of the triode semiconductor switches is connected to the circuit such that they can be rendered conductive by applying a potential to them after the reed switch has closed and current is being transmitted through the circuit. This will allow the electrical conductor including the triode semiconductor switches to serve as a shunt to transmit current through the circuit such that the electric motor will continue to operate afer the reed swich has opened due to a drop in the liquid level. A suitable mechanical linkage or the like between the valve and the motor can be used to turn the motor off after the valve has been moved to its fully open position.

Although the method and apparatus of this invention will have application in a variety of systems, it is particularly adaptable to the flash pot and dump valve of the apparatus diclosed in Patent 3,106,096 to Broerman for removing samples from a polymerization zone.

Accordingly, it is an object of this invention to provide a method and apparatus for controlling the level of a liquid in a vessel.

Another object of this invention is to provide a method and apparatus for removing a liquid from a vessel in response to the level of the liquid in the vessel.

A further object of this invention is to provide a method and apparatus for moving a valve to its fully open position in response to the level of a liquid within a vessel.

Figure 2:
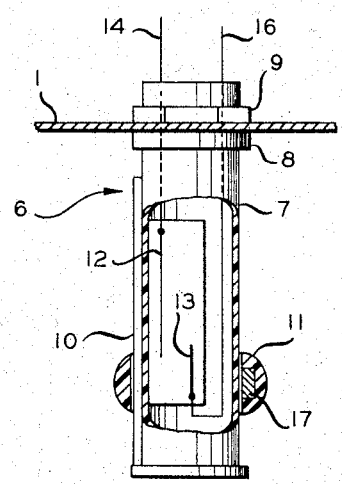

These and other objects of the invention will become apparent to one skilled in the art after a study of the detailed specification, the appended claims, and the accompanying drawing in which:

FIGURE 1 is a schematic representation of an electrical system constructed in accordance with the invention; and FIGURE 2 is a cross-section of a liquid level sensing device including a switch and a float.

Referring now to the drawing wherein like reference numerals are used to denote like elements, and particularly to FIGURE 1, the invention will be described in more detail. A vessel 1 having a liquid inlet conduit 2 is provided with a liquid outlet conduit 3 having a valve 4 operated in accordance with this invention to control the level of liquid within the vessel. The vessel 1 can be a flash pot for receiving a sample from a polymerization reactor such as that disclosed in Patent 3,106,096 to Broerman. Since this invention can be used in a variety of different systems, the vessel 1 can represent any type of storage zone for a liquid such as a surge tank, separator, etc. wherein it is desirous to control the level of the liquid within the storage zone by regulating the amount of liquid removed. The invention also has particular application to a lease automatic custody transfer system.

A liquid level sensing means shown generally by 6 is illustrated in detail in FIGURE 2 of the drawing. The liquid level sensing means includes a tubular-shaped housing 7 having a shoulder 8 which will serve to allow the housing to be secured through an opening in the top of vessel 1 by means of a nut 9. A float 11 constructed of an elastomeric material or the like is slidably mounted around the housing 7 in a manner which will allow it to move up and down in response to the level of the liquid within the vessel. The float 11 and housing 7 can also be constructed of a metal such as brass or aluminum. In this case, the float 11 is hollow so as to provide the necessary buoyancy. A shoulder 10 on the housing 7 will accommodate a groove on the interior surface of the float 11. This will prevent the float 11 from rotating on the housing. The housing 7 is provided with a first contact member 12 and a second contact member 13 having electrically conductive leads or wires 14 and 16, respectively. The float 11 is provided with a magnet 17 which will cause contact member 12 to engage contact member 13, as indicated by the dotted lines, when the float including the magnet is moved into horizontal alignment with the ends of the contact members in response to the level of liquid within the vessel. When the level of liquid drops, the float including the magnet will drop thereby allowing contact member 12 to become disengaged with contact member 13.

The electrical circuit means of this invention includes the electrically conductive leads 14 and 16 which are connected across an electrical potential such as 115 volts by means of contact points 18 and 19. Lead 14 is provided with a relay 21 having a coil 22 and a switch 23 adapted to engage contacts 24 and 26. The switch 23 is operatively connected to contact 18 by means of conductive lead 14 and an electrical conductor 25.

A spring 27 will serve to hold the switch 23 in engagement with contact 26 in the absence of current passage through coil 22 of relay 21. The relay 21 is preferably of the delay action type whereby current can pass through the coil 22 for a preselected period of time before the switch 23 moves into engagement with contact 24.

An electric motor 29 is operatively connected to conductive lead 16 by means of an electrical conductor 31 and to a microswitch 32 by means of an electrical conductor 33. The microswitch 32 is adapted to be moved between contact points 34 and 36 by means of a mechanical linkage 37 by motor 29 of a type well known in the art. For example, a cam and gear box arrangement operatively connected to the motor will serve to move the microswitch by means of the mechanical linkage. A second mechanical linkage 38 operatively connected between the motor 29 and the valve 4 will serve to rotate the valve in response to the operation of the motor. The mechanical linkages 37 and 38 and their cooperation with the invention will be more fully described hereinafter.

The contact points 34 and 36 are operatively connected to contacts 24 and 26 by means of electrical conductors 39 and 41, respectively. The electrical conductors 39 and 41 will serve to transmit current through the microswitch 32 to the motor 29 as conditions dictate.

An electrical conductor 42 having two bidirectional triode semiconductor switches 43 and 44 connected in series is operatively connected between conductive leads 14 and 16. The bidirectional triode semiconductor switches are of the silicon gate-controlled type as described in General Electric's Advance Specifications brochure identified by numeral 175.10, dated February 1964. The gate of triode switch 43 is operatively connected to conductor 39 by means of electrical conductor 46 having a 2000 ohm resistor 47. The gate of triode switch 44 is operatively connected to conductor 33 by means of electrical conductor 48 having a 2000 ohm resistor 49. This arrangement of the conductors 46 and 48 including the resistors 47 and 49, respectively, will allow a potential of about 3 volts to be applied to each of the triode switches such that they are rendered conductive thereby allowing current to flow through the electrical conductor 42.

In describing the operation of this invention, valve 4 is initially closed, microswitch 32 is in engagement with contact 34, switch 23 is out of engagement with contact 24 such that there is no current flow through the electric circuit means, and the liquid level in vessel 1 is below that which is desired. As liquid enters the vessels by means of conduit 2 and the liquid level begins to rise, the float 11 including the magnet 17 also rises. When the liquid level rises to a level such that the magnet becomes horizontally aligned with the ends of contact members 12 and 13, contact member 12 will be urged into engagement with contact member 13 due to the force of the magnet. This will close the electric circuit means such that current will begin to flow through conductors 14 and 16. Since the relay 21 is preferably of the delay action type, current will continue to flow through conductors 14 and 16 without passing through motor 29.

After a predetermined length of time, reflected by the proper setting of the relay 21, the magnetic force obtained by the current flow through coil 22 will overcome the action of spring 27 such that switch 23 is moved into engagement with contact 24. This will allow current flow from contact 18 through conductor 25, switch 23, conductor 39, microswitch 32 and conductor 33 to motor 29, conductor 31, conductor 16 to contact 19. This action by the motor will cause the valve 4 to be rotated approximately 90° by means of mechanical linkage 38, at which time mechanical linkage 37 moves microswitch 32 from contact 34 to contact 36.

It should be noted that as soon as current begins to flow through conductors 39 and 33 to motor 29, conductor 46 will serve to apply a potential to the gate of triode switch 43 such that it is rendered conductive to allow current flow through conductor 42. Similarly, conductor 48 will serve to apply a potential to the gate of triode switch 44 such that it is rendered conductive. The resistors 47 and 49 will serve to reduce a line potential of 115 volts to about 3 volts to the gates of each of the triode switches. This voltage will be sufficient to render the triode switches conductive. Conductor 42 and triode switches 43 and 44 thus form a shunt which will serve to allow current flow through coil 22 of relay 21 thereby maintaining switch 23 in engagement with contact 24 irrespective of the position of contact member 12 after motor 29 had started to open valve 4. Since liquid will start to leave vessel 1 by means of conduit 3 as soon as valve 4 begins to open, and since the liquid level will drop such that the float 11 including the magnet 17 will move out of alignment with the ends of contact members 12 and 13, contact 12 will become disengaged with contact 13 thereby opening the circuit. However, since conductor 42 including triode switches 43 and 44 forms a shunt across the contact members 12 and 13 is response to the initial current flow to motor 29, it is apparent that current will continue to flow to the motor after contact member 12 has moved out of engagement with contact member 13 due to the drop of the liquid level. This will insure continued current flow to motor 29 until valve 4 has been moved to its fully open position once the opening of valve 4 has been initiated.

After the valve 4 has been rotated approximately 90° to its fully open position, the mechanical linkage 37 will serve to move microswitch 32 from contact point 34 into engagement with contact point 36. At this point in time, the current flow through conductor 39 stops and the potential to the gate of triode switch 43 is removed such that it is no longer conductive and the current flow through conductor 42 ceases. Assuming that the liquid level has dropped below that at which the magnet 17 will hold contact members 12 and 13 together, the current flow through conductors 14 to 16 stops thereby allowing spring 27 to move switch 23 into engagement with contact 26. When switch 23 is in engagement with contact 26 and microswitch 32 is in engagement with contact 36, as occurs when the valve 4 has moved to its fully open position and the liquid level has dropped below the level at which contact members 12 and 13 are in engagement, current will flow from contact 18, through conductor 25, switch 23, conductor 41, microswitch 32, conductor 33 to motor 29 through conductor 31, conductor 16 to contact 19. This action of the motor will cause valve 4 to be rotated approximately 90° to its fully closed position whereupon the mechanical linkage 37 will cause microswitch 32 to be moved into engagement wtih contact 34. The electric circuit means of the invention is then positioned for the start of the cycle whereupon it will move valve 4 to its fully open position in response to the desired liquid level as hereinbefore described.

In the event that the liquid level has not dropped below the ends of contact members 12 and 13 when valve 4 has been rotated to its fully open position and mechanical linkage 37 has moved microswitch 32 into engagement with contact 36, current will continue to flow through coil 22 of relay 21 by means of the contact made between contact members 12 and 13 such that switch 23 will be held in engagement with contact 24. This situation could occur when the liquid is viscous and not easily flowable, or when there is a sudden surge of liquid entering the vessel by means of conduit 2 during initial movement of the valve. In either event, the valve will have been fully opened and maintained in its fully open position until the liquid level has dropped to a level at which the magnet 17 is moved out of alignment with the ends of contact members 12 and 13. When the liquid level does drop such that contact 12 moves out of engagement with contact 13, the current flow through coil 22 of relay 21 stops and spring 27 will move switch 23 into engagement with contact 26. Since microswitch 32 was moved into engagement with contact 36 after valve 4 was rotated to its fully open position, current will pass through switch 23 to motor 29 to move the valve to its fully closed position as hereinbefore described.

It can be seen that the level of a liquid in a vessel can be controlled in response to the liquid level in the vessel by means of the novel circuit of this invention. The electrical circuit means of this invention will insure that the valve which regulates the removal of liquid from the vessel in response to the liquid level in the vessel will always be rotated to its fully open or closed position irrespective of changes in the level of liquid in the vessel, once movement of the valve into one of the two positions has been initiated.

It is apparent that the liquid level sensing means can be secured at any desired position within the vessel such that the liquid level can be controlled in response to that position.

Although the invention has been described in considerable detail for the purpose of illustration, it is apparent that such detail is for that purpose only and that many variations and modifications can be made without departing from the spirit and scope of the invention.

I claim:
1. In a system for controlling the level of a liquid within a vessel including first means operatively connected to said vessel for removing liquid therefrom, liquid level sensing means operatively connected to said vessel for sensing the level of liquid therein, electric circuit means operatively connected to said liquid level sensing means for transmitting electric current responsive to a sensed level of liquid within said vessel, and an electric motor operatively connected to said electric circuit means and said first means for moving said first means responsive to current flow to allow liquid to be removed from said vessel, apparatus comprising current conductor means operatively connected to said electric circuit means across said liquid level sensing means for allowing continued current flow to said electric motor to insure that said first means will move to a fully open position after said sensed level of liquid within said vessel has dropped below said liquid level sensing means.

2. Apparatus according to claim 1 wherein said current conductor means includes an electrical conductor operatively connected to said electric circuit means across said liquid level sensing means; a first triode semiconductor switch operatively attached to said electrical conductor; a second triode semiconductor switch operatively attached to said electrical conductor; and means connecting each of said first and second triode semiconductor switches and said electric circuit means for applying a potential to said switches to render said switches conductive to allow current flow though said electrical conductor.

3. In combination with a vessel to contain liquid and means connected to said vessel including a conduit and a valve positioned in said conduit for removing liquid from said vessel, apparatus comprising a liquid level sensing means operatively connected to said vessel for sensing the level of liquid in said vessel, said sensing means including first and second contact members adapted to become engaged in response to a sensed level of liquid in said vessel and adapted to become disengaged in response to a drop of the liquid level in said vessel; electric circuit means operatively connected to said first and second contact members for transmitting electric current after said first and second contact members have become engaged; electric motor means operatively connected to said electric circuit means and said valve for moving said valve in response to current flow through said electric circuit means to allow liquid to be removed from said vessel through said conduit; and means connected to said electric circuit means for allowing continued current flow to said motor after said first and second contact members have become disengaged in response to a drop of the liquid level in said vessel.

4. Apparatus according to claim 3 wherein said means connected to said electric circuit means includes an electrical conductor for transmitting current after said first and second contact members have become disengaged; a first triode semiconductor switch operatively attached to said electrical conductor; a second triode semiconductor switch operatively attached to said electrical conductor; and means connecting each of said first and second triode semiconductor switches and said electric circuit means for applying a potential to said switches to render said switches to render said switches conductive to allow current flow through said electrical conductor.

5. Apparatus for controlling the level of a liquid within a vessel comprising liquid level sensing means operatively connected to said vessel for sensing the level of liquid in said vessel; electric circuit means operatively connected to said liquid level sensing means for transmitting electric current responsive to a sensed level of liquid within said vessel; a relay operatively connected to said electric circuit means, said relay having a switch adapted to be moved from a first to a second position responsive to current flow through said electric circuit means; means connected to said vessel for removing liquid from said vessel, said means including a conduit having a valve adapted to be moved from a closed to an open position; an electric motor operatively connected to said valve for changing the position of said valve; first electrical conductor means connecting said relay and said motor for passing current to said motor after said switch in said relay is in the second position; second electrical conductor means operatively connecting said motor and said electric circuit means; and means connected to said electric circuit means for transmitting current through said relay to maintain said switch in the second position after said sensed level of liquid within said vessel has dropped.

6. Apparatus according to claim 5 wherein said means connected to said electric circuit means includes an electrical conductor; a first triode semiconductor switch operatively connected to said electrical conductor; a second triode semiconductor switch operatively connected to said electrical conductor; and means connecting each of said first and second triode semiconductor switches and said electric circuit means for applying a potential to said switches to render said switches conductive to allow current flow through said electrical conductor.

7. Apparatus according to claim 5 wherein said relay is of a delay action type.

8. Apparatus according to claim 5 wherein said first electrical conductor means is provided with a switch operatively connected to said motor for stopping the current flow to said motor after said valve has been moved to the open position.

9. Apparatus according to claim 5 wherein said liquid level sensing means includes a housing; first and second contact members positioned within said housing and operatively connected to said electric circuit means; a float slidably mounted with said housing and adapted to move in response to the level of liquid within said vessel; and a magnet carried by said float to cause said first and second contact members to become engaged to allow said electric circuit means to transmit current.

References Cited

UNITED STATES PATENTS

| | | | |
|---|---|---|---|
| 2,325,925 | 8/1943 | Waugh | 137—172 X |
| 3,181,557 | 5/1965 | Lannan | 137—392 X |
| 3,229,167 | 1/1966 | Goble | 317—132 |

FOREIGN PATENTS 997,861  7/1965  Great Britain.

WILLIAM F. O'DEA, *Primary Examiner.*

D. R. MATTHEWS, *Assistant Examiner.*